United States Patent [19]

Riddle

[11] Patent Number: 5,444,709

[45] Date of Patent: Aug. 22, 1995

[54] PROTOCOL FOR TRANSPORTING REAL TIME DATA

[75] Inventor: Guy G. Riddle, Los Gatos, Calif.

[73] Assignee: Apple Computer, Inc., Cupertino, Calif.

[21] Appl. No.: 129,992

[22] Filed: Sep. 30, 1993

[51] Int. Cl.⁶ ............................................. H04J 3/26
[52] U.S. Cl. ...................................... 370/94.1; 370/99
[58] Field of Search ................. 370/94.1, 94.2, 91, 370/92, 93, 99, 82, 83, 60, 110.1, 60.1, 95.1, 58.1; 340/825.04, 825.52, 825.5, 825.51, 825.53; 348/461, 463, 465, 467

[56] References Cited

U.S. PATENT DOCUMENTS

| | | | |
|---|---|---|---|
| 5,050,166 | 9/1991 | Cantoni et al. | 370/95.1 |
| 5,140,417 | 8/1992 | Tanaka | 370/85.6 |
| 5,163,045 | 10/1992 | Caram et al. | 370/60.1 |
| 5,253,251 | 10/1993 | Armaki | 370/94.1 |
| 5,333,135 | 7/1994 | Wendort | 370/99 |

OTHER PUBLICATIONS

Stallings, "Data and Computer Communications", 1988 pp. 127, 128, 395-396, 141-144, 150, 152, 256-257, 429-432.

Primary Examiner—Douglas W. Olms
Assistant Examiner—Huy D. Vu
Attorney, Agent, or Firm—Burns, Doane, Swecker & Mathis

[57] ABSTRACT

A real-time data stream is transmitted in data packets from a data source in accordance with a predetermined protocol over a shared network. Data packets of said real-time data stream are received at a data destination connected to the local area network. The data destination then reconstitutes the real-time data stream using information included in the data packets in accordance with the predetermined protocol. More particularly, a plurality of data frames are transmitted from the data source, each including at least one data packet. Each data packet includes a sequence number S identifying the data packet as the Sth data packet transmitted in the data stream and a frame number N identifying the data packet as belonging to an Nth frame transmitted in the data stream. Data packets that are the first data packets in respective frames to which they belong and data packets that are the last data packets in respective frames to which they belong include flags identifying them as such. At least some of the data packets are received at the data destination and, using sequence numbers, frame numbers, and the flags in the data packets, complete data frames received at the data destination are identified. Data frames that are timely received, as judged in relation to received data packets belonging to other frames, are forwarded to a higher-level process. Packets not belonging to complete data frames timely received are discarded. In this manner, the isochronous nature of the real-time data stream is maintained.

29 Claims, 3 Drawing Sheets

PROTOCOL FOR TRANSPORTING REAL TIME DATA

BACKGROUND OF THE INVENTION

1. Field of the Invention

The present invention relates to data streaming protocols and more particularly to protocols for transporting real time data.

2. State of the Art

One of the characteristics of a real-time data stream, such as a videophone data stream, is that it is isochronous-that time is of the essence. If an error occurs in a video or audio stream, the system cannot afford the time to stop everything and retransmit the lost data packets-this will seriously upset the real-time data flow. A better procedure is to just "plow ahead" and pick up the video (or audio) with the next intact frame received.

A protocol is simply a set of mutually agreed upon rules of procedure stating how two or more parties are to interact to exchange information. Virtually all major telecommunications network architectures presently use a layered protocol architecture. As described in Spragins, *Telecommunications: Protocols and Design* (Addison-Wesley, 1991, incorporated herein by reference), the basic idea of a layered architecture is to divide the architecture into small pieces. Each layer adds to services provided by lower layers in such a manner that the highest layer is provided a full set of services to manage communications and run distributed applications. Independence of layers is ensured by defining services provided by each layer to the next higher layer without defining how services are performed, thereby permitting changes in a layer without affecting other layers.

The Open Systems Interconnection (OSI) Reference Model Architecture, developed by the International Organization for Standardization (ISO), describes layered network architectures. The manner in which peer-to-peer communication is performed is shown in FIG. 1, illustrating communication from application X to application Y with application X presenting application data (AP data) to the system for transmission to application Y.

Figure 1:
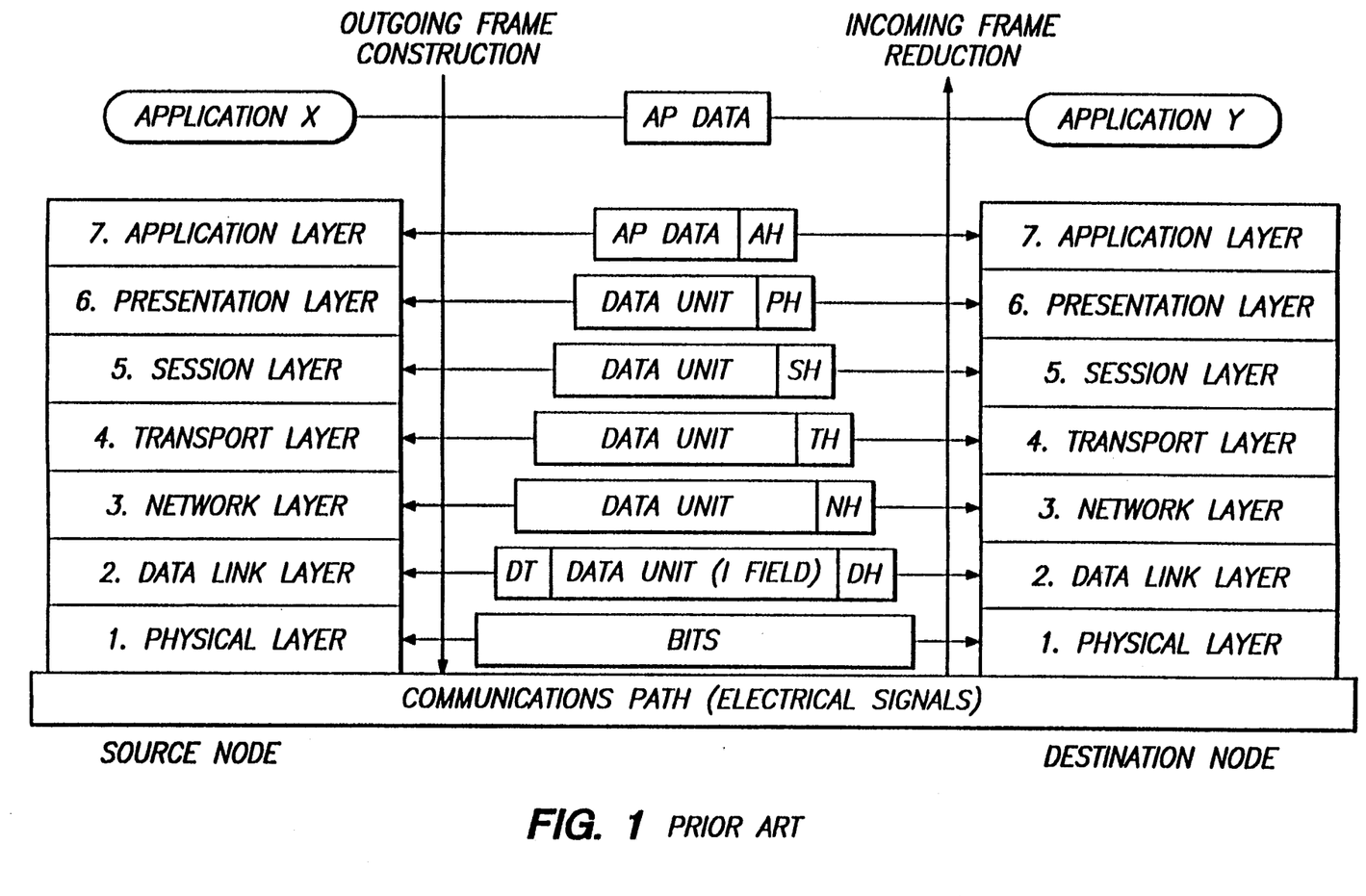
FIG. 1 is a diagram illustrating conventional outgoing frame construction and incoming frame reduction in accordance with the OSI architecture.

Referring to FIG. 1, in constructing an outgoing frame, each layer (except for the physical layer) may add one or more fields to information from higher layers, with corresponding field(s) stripped off by the corresponding peer layer during incoming frame reduction. The added fields are used for peer-to-peer communication. The application layer at the source adds an application header (AH), containing information it wants to send to its peer application layer, to application data. The AH is passed unchanged (ignoring transmission errors) to the receiver where the application layer strips it off and takes actions indicated by its contents. The remaining portion of the received packet is AP data and is passed up to application Y. Similarly, a presentation header (PH), session header (SH, transport header (TH), network header (NH), and data link header (DH) are added by the corresponding layer at the transmitting end and stripped off by the peer layer at the receiving end, with each used for peer-to-peer communication. Each layer treats the assemblage of information from higher layers as data, and does not worry about its contents.

The data link layer may also add a data link trailer (DT) to the end of the message, primarily error control information most readily put at the end of a frame. At intermediate nodes (not shown), the data link and network layers strip off their headers as the packet flows up at such nodes, and add new headers as it flows back down. No header or trailer is added at the physical layer, which does not recognize data units larger than a bit and views data as a string of bits. Similarly, the communications path views information as a sequence of electrical (or optical) signals used to transmit bits.

In addition to data messages that flow across the network as indicated, control messages may be exchanged between peer processes at any layer. Each peer-to-peer protocol defines control messages for purposes such as setting up connections at that layer, flow control, and error control. Control messages generated by layers originate at those layers and have headers (occasionally trailers) added by lower layers.

In the case of a point-to-point network, such as the telephone network, protocols may be relatively simple. Exchange of real-time data streams, such as voice, over such networks is, of course, well-known. In the case of a multipoint network, such as a local area network (or LAN), on the other hand, protocols are required to be significantly more involved to ensure that the correct information arrives at the correct destination(s) at the right time. The present invention is directed toward exchange of real-time data streams over networks of the latter type.

For these purposes, protocols such as the AppleTalk ® Data Stream Protocol (ADSP), AppleTalk ® Transaction Protocol (ATP), and Transmission Control Protocol (TCP) provide error correction capabilities that are unwanted, and lower-level protocols such as the Datagram Delivery Protocol (DDP), Unsequenced Datagram Protocol (UDP), and Internet Protocol (IP) do not provide sufficient error-detection facilities.

In ADSP, for example, when a packet sent by end A is lost, the receiver, end B, discards subsequent packets because they are out of sequence (as indicated by a sequence number included in each packet). When end A has sent all of the data in its send queue, it sends an acknowledgement request to end B. In response, end B sends a message indicating that it is still expecting the lost packet and packets subsequent (which were discarded). End A then retransmits all of the lost data.

DDP, on the other hand, is a simple, best-effort protocol for internet-wide, socket-to-socket delivery of datagrams. (An internet consists of one or more networks connected by intelligent store-and-forward devices; a socket is an addressable entity within a node connected to a network, used by a software process to send and receive datagrams; a datagram is self-contained packet, independent of other packets in a data stream and carrying its own source and destination information.) Typically, the receiver has no way of knowing in what order datagrams have been sent to it and which datagrams may have been lost. Further details concerning protocols within the AppleTalk ® protocol suite, including ADSP, ATP and DDP, may be found in *Inside AppleTalk* ®, Second Edition, an official publication of Apple Computer, Inc.

Therefore, what is needed is a new simple protocol tailored to the requirements of isochronous data streams.

SUMMARY OF THE INVENTION

The present invention, generally speaking, provides for transmission of real-time data streams over computer networks. A real-time data stream is transmitted in data packets from a data source in accordance with a predetermined protocol over a shared network, for example. Data packets of said real-time data stream are received at a data destination connected to the local area network. The data destination then reconstitutes the real-time data stream using information included in the data packets in accordance with the predetermined protocol. More particularly, a plurality of data frames are transmitted from the data source, each including at least one data packet. Each data packet includes a sequence number S identifying the data packet as the Sth data packet transmitted in the data stream and a frame number N identifying the data packet as belonging to an Nth frame transmitted in the data stream. Data packets that are the first data packets in respective frames to which they belong and data packets that are the last data packets in respective frames to which they belong include flags identifying them as such. At least some of the data packets are received at the data destination and, using sequence numbers, frame numbers, and the flags in the data packets, complete data frames received at the data destination are identified. Data frames that are timely received, as judged in relation to received data packets belonging to other frames, are forwarded to a higher-level process. Packets not belonging to complete data frames timely received are discarded. In this manner, the isochronous nature of the real-time data stream is maintained.

BRIEF DESCRIPTION OF THE DRAWING

The present invention may be further understood from the following written description in conjunction with the appended drawing. In the drawing.

DETAILED DESCRIPTION OF THE PREFERRED EMBODIMENT

The present protocol for transporting real-time data, in terms of the OSI model, is a transport layer protocol. The transport layer provides transparent transfer of data between systems, providing end-to-end control and information interchange with the quality of service needed by the application program. The transport layer is the first true end-to-end layer.

Figure 2:
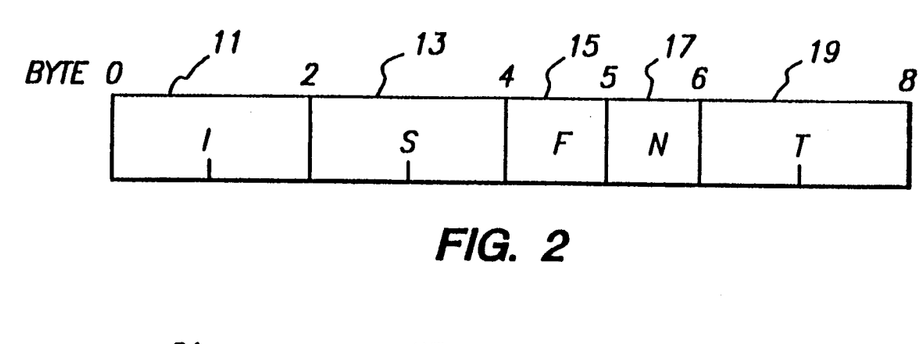
FIG. 2 is a diagram of a data packet header used to transport real-time data streams.

The header of FIG. 2 is therefore intended to be used above a network level protocol like DDP or UDP that provide the addressing (and checksums) for unreliable datagrams that may be delivered out-of-sequence.

The header may also be used over real or virtual circuits that guarantee packets will not arrive out-of-order, but it does not rely on that feature. In FIG. 1, I = stream ID
S = packet sequence number
F = flags
N = frame number
T = timestamp in ticks (1/60 sec).

Referring to FIG. 2, some characteristics of the header are that it is fixed-size, small (exactly 8 bytes long), and avoids causing alignment problems (being 8 bytes long). All two-byte quantities are transmitted big-endian high order byte first. The stream ID 11 serves to distinguish different data streams sent from the same source. If all active streams within a system have unique stream IDs the receiving node does not also have to consult the source network address to process the data. A method of picking stream IDs to achieve this is described below. Stream ID 0 is reserved for control functions of this protocol layer.

The packet sequence number 13 counts on a per-stream basis and is used to detect lost or out-of-sequence packets. The first packet on each stream has sequence number 1.

The flags 15 mark various attributes of a packet that are likely to change between the different packets of a stream. Some assigned bits are described in greater detail below.

The frame number 17 denotes to which frame this packet belongs. Video frame data is likely to be larger than the maximum packet size allowed by the network, and so must be divided into multiple packets for transmission. This field, along with some flag bits, allows the receiving node to determine when it has received a complete frame. Note that the term "frame" is not limited to video data but refers to the unit of data that must be assembled in its entirety before being passed to an upper protocol layer (or to be decompressed).

The timestamp 19 reflects the time of capture of the data in the present frame (i.e., T should be the same for all packets in the frame), not the time of transmission. The two times may vary significantly due to the time taken for compression, for example. The purpose of this field is to allow the receiver to synchronize playback among independent streams.

The first packet in a frame, the last packet in a frame, and packets in a key frame are identified by flag bits in accordance with the following flag bit definitions:

1XXX XXXX first packet in frame
X1XX XXXX last packet in frame
XXXX XXX1 key frame The definition of a key frame is one where the higher layer can resynchronize after experiencing a data loss in the stream. For example, if the transmitting node is performing temporal compression of video data, most transmitted frames only contain changes from the previous frame image; therefore, if a frame is lost, the receiving node cannot reconstruct the image from succeeding incremental changes. So, periodically (or when necessary) the transmitting node must transmit a "key frame" containing a complete current image.

A frame reassembly process combines the packets in a frame and passes them up to a higher layer, say for decompression.

The frame reassembly process uses the following variables:

F = next frame number expected (initially 1)
S = state (initially in-synch)
C = out-of-sync threshold (value 2, for example)

The frame reassembly process R is described by the following steps:

1. A new packet arrives with frame number N and is placed in the reassembly pool.

2. If complete frame F is not in the reassembly pool, go to step 4.

3. Remove frame F from the pool

```
if the key frame bit is set in the flags of
frame F
    set state S = in-synch
if state S == in-synch
    forward frame F to the higher levels
else
    discard frame F
set F = F + 1
go to step 2.
```

4. If there are C or more complete frames in the reassembly pool

```
set state S = out-of-synch
set F = F + 1
go to step 2.
```

5. Discard all packets in the reassembly pool with frame numbers <F.

C, the number of complete frames other than the expected frame to be found in the reassembly pool in order to declare an out-of-sync condition, may be chosen to be any suitable value.

The definition of a complete frame is a number of packets all having the same frame number, having contiguous sequence numbers, and having the first flag bit set in the lowest-numbered packet and the last flag bit set in the highest-numbered packet. One packet may be both first and last.

Call set up is done at a higher level on a error-controlled control channel using a protocol like ADSP or TCP. The type of data sent on each stream and what to do with it when it arrives is saved in a data structure on the receiving end at protocol layers above the Transport level—nothing is sent in each packet to indicate this. Streams are one-way.

Timestamps are in units of ticks (1/60 second), a time resolution easily available on many personal computers and adequate for most video streams, which are usually sampled at 30 times per second or less frequently.

The size of the S, N, and T fields in FIG. 2 are chosen to be small to not waste bandwidth but large enough to serve the purposes of reassembling packets in a stream. It is likely that all of these variables may wrap around during the course of a videophone call. In process R above, the variable F is therefore determined by modulo $2^n$ arithmetic where n is the number of bits in the frame number field (8 in the illustrated embodiment).

When choosing stream ID numbers, the goal is to pick numbers that are unique across all the streams on a machine and do not get reused often (to prevent stray late packets from interfering with the wrong session after the stream they belonged to has been closed).

Figure 3:
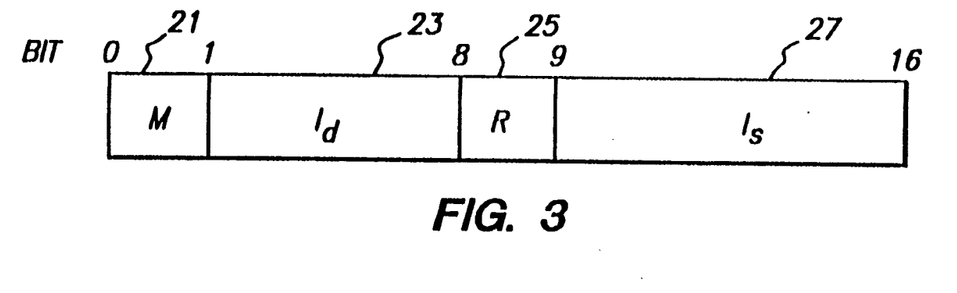
FIG. 3 is a diagram illustrating subdivision of the bits in the stream ID space of the header of FIG. 2.

The bits in the stream ID space are subdivided as shown in FIG. 3, in which:
M = multicast
$I_d$ = stream ID part chosen by destination
R = reserved
$I_s$ = stream ID part chosen by source Bit M is set to 1 for streams involved in multicast sessions (as designated by some higher-level means). All two-party streams have M set to 0. Bit R is reserved, always 0.

Field $I_s$ is selected by the creator of the stream, i.e., the data source. (Recall that streams are one way.) It has values from 1 to 127. Field $I_d$ is chosen by the stream destination. Values are 1 to 127.

The following procedure is used to pick a new, unique, stream ID. The process uses the following variables, kept in each machine:

$N_d$ = next destination partial stream ID, initially 1
$N_s$ = next source partial stream ID, initially 1.

The stream identification selection process S is described by the following steps:

1. The stream creator and source picks $I_s$ via:

```
while (some active stream has its I_s component
    == N_s)
        set N_s = N_s + 1 (if N_s == 128, set N_s = 1)
pick I_s = N_s
set N_s = N_s + 1 (if N_s == 128, set N_s = 1)
Sent I_s to the destination via the control
channel.
```

2. The destination picks $I_d$ via:

```
while (some active stream has an I_d component
    == N_d and an I_s component == I_s received from
    the source)
        set N_d = N_d + 1 (if N_s == 128, set N_s =
        1)
pick I_d = N_d
set N_d = N_d + 1 (if N_s == 128, set N_s = 1)
Sent I_d back to the source via the control
channel.
```

3. The source composes the stream ID from M=0, $I_d$, R=O, and $I_s$ and both sides hereafter use it as a single 16 bit value.

The process S described above is for the most part similar to the picking of source and destination socket numbers for a protocol such as DDP. Considering the stream ID as a single 16-bit value does, however, allow a host to support more than 127 (or 256) simultaneously active sessions as well as giving 15 bits for the choice of multicast stream IDs.

A common method with temporally compressed video streams is to generate a key frame at periodic intervals, say every 5 seconds. Instead of waiting for the next key frame to come along "naturally", a quicker, preferable way to recover from errors in video streams is for the receiver to tell the transmitter whenever it becomes "out of synch" and for the transmitter to only generate key frames "on demand". This reduces the bandwidth required in normal situations, as key frames are larger than difference frames produced with temporal compression. This technique also reduces the latency between the occurrence of an error and the time the receiver can resume displaying the video stream.

The generation of key frames on demand may be accomplished by altering the process R above so that in step 3 the directive "Discard frame F" is replaced by "Inform transmitter of out-of-sync frame F (via process L) and discard frame F".

Figure 4:
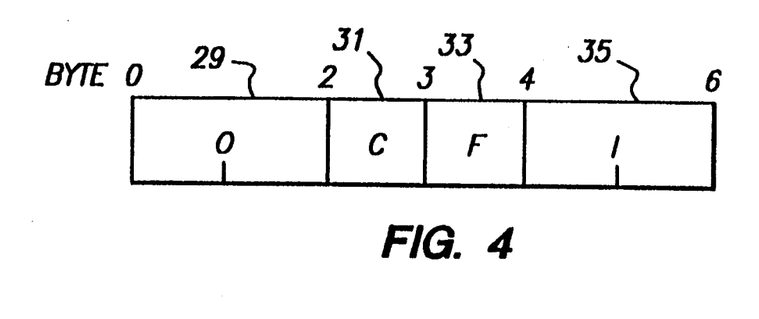
FIG. 4 is a diagram of a management channel header.

The process L is described by the following steps:

1. Send to the transmitter (use source network address on the frame F) a message as in FIG. 4, in which:
    C = command (value = 17→out-of-synch)
    F = frame number (just being discarded by process R)
    I = stream ID that sustained the error Note that the header of messages directed to stream ID 0, the management channel, have a different format than the data stream header of FIG. 1. That header could have been used on the management channel with the necessary command code and other items added as data following it. However, stream ID 0 needs special processing in any case due to its receiving data from multiple sources—a sequence number cannot be used in stream 0 to reassemble packets. Instead, management messages on stream 0 are limited to be a single packet in length so no reassembly is needed.

Each transmitter keeps the following variable per stream:

K = frame number of last key frame sent
H = higher level already told (initially false)

Each time a management frame arrives on stream 0 with command field C = = 17 (out-of-synch), the following process K is performed:

1. If stream ID I from the packet is valid and frame number F from the packet is <K and H is false, tell the higher levels to generate a new key frame and set H to true. (Else ignore the command).
2. When the upper levels generate a new key frame, update variable K and set H to false.

If a key frame is sent less often than every 256 frames, special care must be exercised when maintaining the last key frame variable K to account for wrap around of the variable K.

Figure 5:
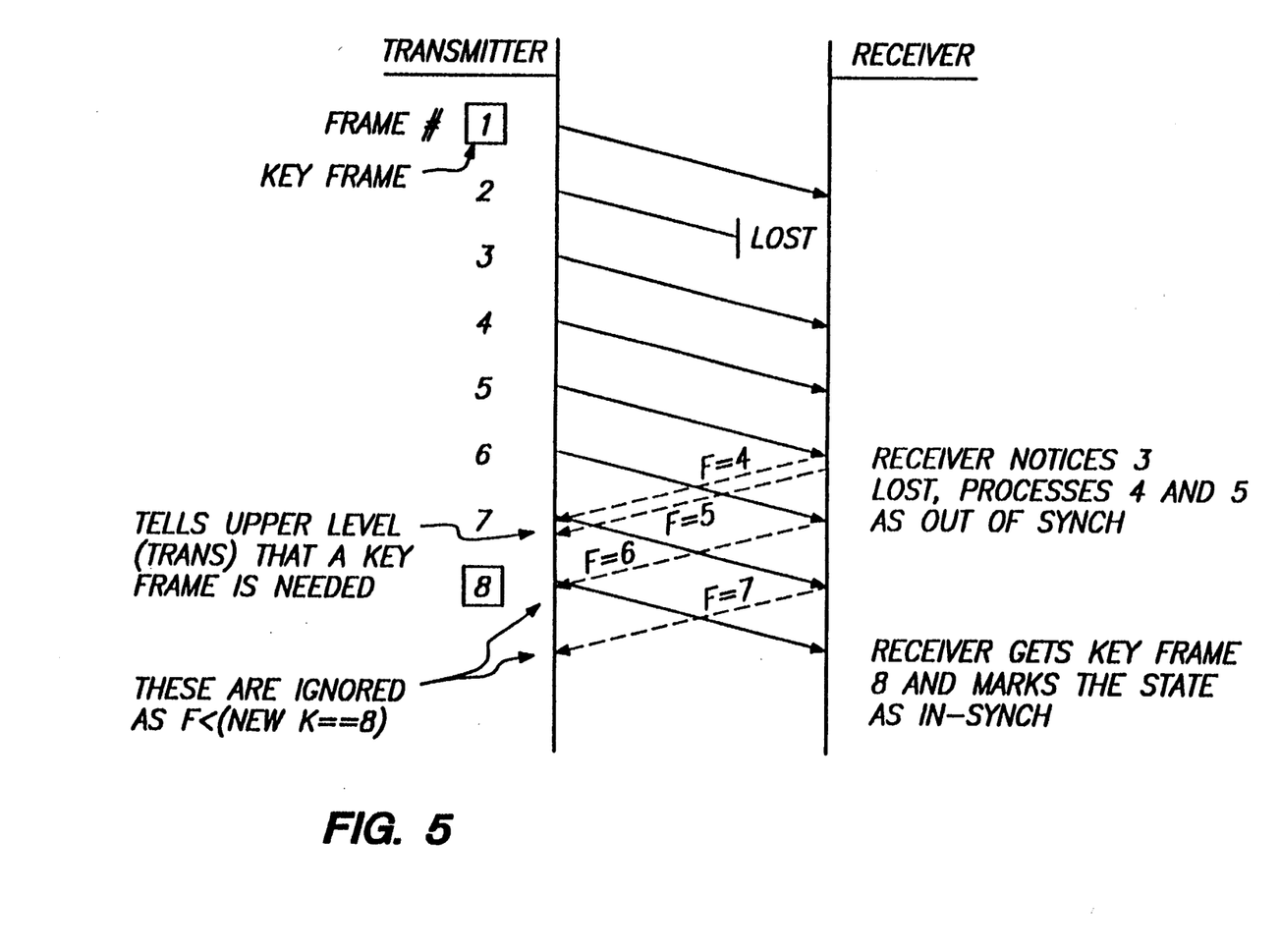
FIG. 5 is an exemplary timeline illustrating transport of a real-time data stream.

The sample timeline of FIG. 5 illustrates the operation of sending key frames only on demand. Referring to FIG. 5, frames numbered 1 through 8 are transmitted from a transmitter on the left to a receiver on the right. Key frames are indicated by a box surrounding the frame number. Frames 1 and 8 are key frames. The simplified example of FIG. 5 assumes that each frame is only one packet long and that the frames arrive in sequence or do not arrive at all. In actual practice, frames may include multiple packets, which may arrive out of order. The reassembly process R described above reassembles the packets into frames and forwards them to a higher level in the proper order.

The non-zero slope of the line segments between the transmitter and receiver represents propagation delay between the two stations, including transmission media delays and store-and-forward delays in the case of multi-hop transmissions.

Frame 1, a key frame, is first transmitted, followed by frame 2 and frame 3. Frames 1 and 2 are received at the receiver. Frame 3, however, is lost somewhere in the network. Meanwhile, frames 4 and 5 have been sent and are received at the receiver. Since two complete frames other than the expected frame have now been received at the receiver, the receiver determines that it is out of synch. It therefore discards frame 4 and send a corresponding out-of-synch message to the transmitter on the management channel and does the same for frame 5.

By the time the out-of-synch messages reach the transmitter, the transmitter has already sent two additional frames 6 and 7. The first out-of-synch message is passed up to a higher level, causing the higher level to generate a key frame, frame 8, which is then sent to the receiver.

When the receiver receives frames 6 and 7 it again discards them and sends corresponding out-of-synch messages, the new key frame 8 having not yet been received. When these latter out-of-synch messages are received at the transmitter, the transmitter ignores them, recognizing that they correspond to frames sent prior to when the most recent key frame, frame 8, was sent.

When key frame 8 is received, the receiver is again in synch and can resume normal processing of the real-time data stream.

If DDP is used to implement the underlying network layer, the present protocol is attached to a fixed, well-known socket number <128 (instead of a dynamically acquired socket number) to provide for multicast support, as the same message must be able to be accepted at all nodes participating in the call. In the case of UDP, all traffic also goes to a well-known socket.

The described protocol for transporting real-time data greatly furthers the integration of sound and video into not merely individual personal computers but networks of personal computers, enabling new kinds of collaborative work. The new protocol is simple yet powerful, being specifically tailored to the requirements of isochronous data streams. The simplicity of the protocol, together with the feature of transmitting key frames on demand, makes it bandwidth efficient, saving bandwidth resources for the data streams themselves.

The foregoing has described the principles, preferred embodiments, and modes of operation of the present invention. However, the invention should not be limited to the embodiments discussed. The above-described embodiments should therefore be regarded as illustrative rather than restrictive. Variations in those embodiments may be made without departing from the scope of the present invention as defined by the following claims. For example, in FIGS. 2-4, the order and size of the various illustrated fields may be freely varied. Similarly, the value of the variable C in the reassembly process may be chosen to be any suitable value. Other variations will be apparent to one of ordinary skill in the art.

What is claimed is:

1. A method of transmitting over a shared computer network a data stream captured from a real time data signal as capture is proceeding, comprising the steps of:

transmitting from a data source a plurality of data frames each including a frame number N identifying the data frame as an Nth frame transmitted in said data stream;

receiving at least some of said data frames at a data destination;

judging in relation to receipt of other data frames whether each data frame received has been timely received;

forwarding data frames that have been timely received to a higher level process; and discarding data frames not timely received;

wherein at least some data frames are transmitted only once regardless of whether or not they are received at said data destination.

2. A method of transmitting over a shared computer network a data stream captured from a real time data signal as capture is proceeding, comprising the steps of:

transmitting from a data source a plurality of data frames each including at least one data packet, each data packet including a sequence number S identifying the data packet as the Sth data packet transmitted in said data stream and a frame number N identifying the data packet as belonging to an Nth frame transmitted in said data stream;

receiving at least some of said data packets at a data destination;

using sequence numbers and frame numbers of said data packets, identifying and assembling complete data frames data packets of which have all been received at said data destination;

judging in relation to receipt of other data frames whether each data frame received has been timely received;

forwarding data frames that have been timely received to a higher level process; and discarding data packets not belonging to complete data frames timely received.

3. A method of transmitting over a shared computer network a data stream captured from a real time data signal as capture is proceeding, comprising the steps of:

transmitting from a data source a plurality of data frames each including at least one data packet, each data packet including a sequence number S identifying the data packet as the Sth data packet transmitted in said data stream and a frame number N identifying the data packet as belonging to an Nth frame transmitted in said data stream, data packets that are the first data packets in respective frames to which they belong and data packets that are the last data packets in respective frames to which they belong including flags identifying said first and last data packets;

receiving at least some of said data packets at a data destination;

using sequence numbers, frame numbers and said flags of said data packets, identifying and assembling complete data frames data packets of which have all been received at said data destination;

judging in relation to receipt of other data frames whether each data frame received has been timely received;

forwarding data frames that have been timely received to a higher level process; and discarding data packets not belonging to complete data frames timely received.

4. The method of claim 3 wherein said forwarding step comprises forwarding said complete data frames in order of said frame number.

5. The method of claim 4 comprising the further steps of:

including in at least one data packet of selected ones of said data frames a flag identifying said ones of said data frames as key data frames; and when a next frame in order of said frame number to be forwarded to said higher level process is not complete and timely received, ceasing to forward data frames to said higher level process until a complete key data frame is received, and forwarding said complete key data frame to said higher level process.

6. A method of transmitting over a shared computer network a plurality of data streams captured from a plurality of real time data signals as capture is proceeding, comprising the steps of:

for each of said plurality of data streams, transmitting from a data source a plurality of data frames each including a frame number N, identifying the frame as an Nth frame transmitted in said data stream, and a stream identifier I;

receiving at least some of said data frames at a data destination;

judging in relation to receipt of other data frames whether each data frame received has been timely received;

forwarding data frames that have been timely received to a higher level process; and discarding data frames not timely received;

wherein at least some data frames are transmitted only once regardless of whether or not they are received at said data destination.

7. The method of claim 6, wherein said transmitting step further comprises including in at least one data packet of each data frame a timestamp relating to a time of capture of said data frame.

8. A method of transmitting over a shared computer network a plurality of data streams captured from a plurality of real time data signals as capture is proceeding, comprising the steps of:

for each of said plurality of data streams, transmitting from a data source a plurality of data frames each including at least one data packet, each data packet including a sequence number S identifying the data packet as the Sth data packet transmitted in said data stream, a frame number N identifying the data packet as belonging to an Nth frame transmitted in said data stream and a stream identifier I uniquely identifying said data stream;

receiving at least some of said data packets at a data destination;

using sequence numbers, frame numbers and stream identifiers of said data packets, identifying and assembling complete data frames data packets of which have all been received at said data destination;

judging in relation to receipt of other data frames whether each data frame received has been timely received;

forwarding data frames that have been timely received to a higher level process; and discarding data packets not belonging to complete data frames timely received.

9. The method of claim 8, wherein said transmitting step further comprises including in at least one data packet of each data frame a timestamp relating to a time of capture of said data frame.

10. A method of transmitting over a shared computer network a plurality of data streams captured from a plurality of real time data signals as capture is proceeding, comprising the steps of:

transmitting from a data source a plurality of data frames each including at least one data packet, each data packet including a sequence number S identifying the data packet as the Sth data packet transmitted in said data stream, a frame number N identified in the data packet as belonging to an Nth frame transmitted in said data stream, and a stream identifier I uniquely identifying said data stream, data packets that are the first data packets in respective frames to which they belong and data packets that are the last data packets in respective frames to which they belong including flags identifying said first and last data packets;

receiving at least some of said data packets at a data destination;

using sequence numbers, frame numbers, stream identifiers and said flags of said data packets, identifying and assembling complete data frames data packets of which have all been received at said data destination;

judging in relation to receipt of other data frames whether each data frame received has been timely received;

forwarding data frames that have been timely received to a higher level process; and discarding data packets not belonging to complete data frames timely received.

11. The method of claim 10, wherein said transmitting step further comprises including in at least one data packet of each data frame a timestamp relating to a time of capture of said data frame.

12. The method of claim 10 wherein said forwarding step comprises forwarding said complete data frames in order of said frame number, skipping frame numbers of data frames none of the data packets of which are received and data frames of which only some data packets have been received and have therefore been discarded.

13. The method of claim 12, comprising the further steps of, for each of said plurality of data streams:

choosing a first field of said stream identifier at said data source;

requesting said data destination to choose a second field of said stream identifier;

choosing said second field of said stream identifier at said data destination;

communicating said second field of said stream identifier to said data source; and including said first and second fields in said stream identifier.

14. The method of claim 13 comprising the further step of, at each data source, maintaining a record of values of said first field currently in use at that data source.

15. The method of claim 14 comprising the further step of, at each data destination, maintaining a record of values of said second field currently in use at that data destination.

16. The method of claim 15 comprising the further steps of, for each of said plurality of real-time data streams, choosing a unique stream identifier I by:

sending from the data source to the data destination a first value different than the values currently in use of the field whose contents are chosen by the data source; and sending from the data destination to the data source a second value different than the values currently in use of the field whose contents are chosen by the data destination;

both the data source and the data destination thereafter using as part of said unique stream identifier a concatenation of said first value and said second value.

17. The method of claim 12 comprising the further steps of:

including in at least one data packet of selected ones of said data frames a flag identifying said ones of said data frames as key data frames; and when a next frame in said order to be forwarded to said higher level process is not complete and timely received, ceasing to forward data frames to said higher level process until a complete key data frame is received, and forwarding said complete key data frame to said higher level process.

18. The method of claim 17 wherein one of said plurality of real-time data streams is designated as a management channel.

19. The method of claim 18 comprising the further step of:

when a next frame in said order is not complete and timely received as judged in relation to receipt of other data frames, transmitting from said data destination to said data source on said management channel a data packet indicating an out-of-sync condition.

20. The method of claim 19 wherein the data packet indicating an out-of-sync condition further indicates a frame number of a frame discarded as a consequence of said next frame in said order being not complete and timely received.

21. The method of claim 20 comprising the further step of, at said data source, maintaining a record of a frame number of a last key frame sent by said data source to said data destination.

22. The method of claim 21 comprising the further step of receiving at said data source said data packet indicating an out-of-sync condition and the frame number of a frame discarded.

23. The method of claim 22 comprising the further step of generating and sending from the data source to the data destination a new key frame only if the frame number of the frame discarded is at least as great as the frame number of the last key frame sent by the data source to the data destination.

24. The method of claim 23, wherein the data source passes a request for a new key frame to a higher protocol level in response to selected ones of data packets indicating an out-of-sync condition, comprising the further steps of, at the data source, maintaining a record of whether a request for a new key frame is pending and only passing a request for a new key frame to the higher protocol level when no such request is currently pending.

25. A method of transmitting over a shared computer network a data stream captured from a real time data signal as capture is proceeding, comprising the steps of:

transmitting from a data source a plurality of data frames each including a frame number N identifying the data frame as an Nth frame transmitted in said data stream;

receiving at least some of said data frames at a plurality of data destinations;

at each data destination, judging in relation to receipt of other data frames whether each data frame received has been timely received;

forwarding data frames that have been timely received to a higher level process; and discarding data frames not timely received;

wherein at least some data frames are transmitted only once regardless of whether or not they are received at said data destination.

26. A method of transmitting over a shared computer network a data stream captured from a real time data signal as capture is proceeding, comprising the steps of:

transmitting from a data source a plurality of data frames each including at least one data packet, each data packet including a sequence number S identifying the data packet as the Sth data packet transmitted in said data stream and a frame number N identifying the data packet as belonging to an Nth frame transmitted in said data stream;

receiving at least some of said data packets at a plurality data destinations;

at each data destination, identifying and assembling complete data frames data packets of which have all been received at said data destination Using sequence numbers and frame numbers of said data packets;

judging in relation to receipt of other data frames whether each data frame received has been timely received;

forwarding data frames that have been timely received to a higher level process; and discarding data packets not belonging to complete data frames timely received.

27. A method of transmitting over a shared computer network a data stream captured from a real time data signal as capture is proceeding, comprising the steps of:

transmitting from a data source a plurality of data frames each including at least one data packet, each data packet including a sequence number S identifying the data packet as the Sth data packet transmitted in said data stream and a frame number N identified in the data packet as belonging to an Nth frame transmitted in said data stream, data packets that are the first data packets in respective frames to which they belong and data packets that are the last data packets in respective frames to which they belong including flags identifying said first and last data packets;

receiving at least some of said data packets at a plurality of data destinations;

at each data destination, identifying and assembling complete data frames data packets of which have all been received at said data destination using sequence numbers, frame numbers and said flags of said data packets;

judging in relation to receipt of other data frames whether each data frame received has been timely received;

forwarding data frames that have been timely received to a higher level process; and discarding data packets not belonging to complete data frames timely received.

28. The method of claim 27 wherein said forwarding step comprises forwarding said complete data frames in order of said frame number, skipping frame numbers of data frames none of the data packets of which are received and data frames of which only some data packets have been received and have therefore been discarded.

29. The method of claim 28 comprising the further steps of:

including in at least one data packet of selected ones of said data frames a flag identifying said ones of said data frames as key data frames; and when a next frame in said order to be forwarded to said higher level process is not complete and timely received, ceasing to forward data frames to said higher level process until a complete key data frame is received, and forwarding said complete key data frame to said higher level process.

* * * * *

UNITED STATES PATENT AND TRADEMARK OFFICE
CERTIFICATE OF CORRECTION

PATENT NO. : 5,444,709
DATED : August 22, 1995
INVENTOR(S) : Guy Gregory Riddle

It is certified that error appears in the above-indentified patent and that said Letters Patent is hereby corrected as shown below:

Column 12, line 65, delete the word [Using] and insert in place thereof --using--.

Signed and Sealed this

Nineteenth Day of December, 1995

BRUCE LEHMAN

*Attest:*

*Attesting Officer*  *Commissioner of Patents and Trademarks*